United States Patent [19]

Leclert et al.

[11] Patent Number: 4,484,337
[45] Date of Patent: Nov. 20, 1984

[54] CARRIER WAVE REGENERATING CIRCUIT

[76] Inventors: Alain Leclert, Kerleo Ploulec'h; Georges Verdot, 32, rue de l'Aérodrome, both of 22300 Lannion, France

[21] Appl. No.: 399,262

[22] Filed: Jul. 19, 1982

[30] Foreign Application Priority Data

Jul. 23, 1981 [FR] France ................................ 81 14343

[51] Int. Cl.$^3$ ............................................. H03D 3/24
[52] U.S. Cl. ........................................ 375/81; 375/39; 375/120; 329/124
[58] Field of Search ................. 329/50, 112, 122, 124, 329/135; 328/133, 134; 375/77, 81, 120, 39, 86; 455/202, 204

[56] References Cited

U.S. PATENT DOCUMENTS

| | | | |
|---|---|---|---|
| 3,818,347 | 6/1974 | Holsinger | 375/39 |
| 4,095,187 | 6/1978 | Yoshida | 375/77 |
| 4,134,075 | 1/1979 | Washio | 329/135 |
| 4,143,322 | 3/1979 | Shimamura | 375/81 |
| 4,253,189 | 2/1981 | Lemoussa et al. | 375/77 |

OTHER PUBLICATIONS

Electronics and Communications in Japan, vol. 56-A, No. 3, 1973, Washington (U.S.) H. Yanagidaira et al.
W. C. Lindsey: "Synchronization Systems in Communication and Control", 1972, Prentice-Hall, Inc. N.J., Chapter 3.

*Primary Examiner*—Benedict V. Safourek
*Attorney, Agent, or Firm*—Oblon, Fisher, Spivak, McClelland & Maier.

[57] ABSTRACT

A circuit for regenerating a carrier wave on the basis of a modulated wave. It comprises a voltage-controlled oscillator, two demodulators supplying two demodulated signals, respectively X for the first and Y for the second; a first decision and regeneration circuit with an input connected to the first demodulator and an output supplying a difference signal (X-X̂), in which X̂ is a signal regenerated from signal X; a first zero threshold comparator connected to the first demodulator and supplying a signal determining the sign of X, i.e., sgn X; a second zero threshold comparator connected to the decision and regeneration circuit and determining the sign of the difference X-X̂, i.e. sgn (X-X̂); a second decision and regeneration circuit connected to the second demodulator and supplying a difference signal (Y-Ŷ), in which Ŷ is a signal regenerated from signal Y; a third zero threshold comparator connected to the second demodulator and supplying a signal determining the sign of Y, i.e. sgn Y; a fourth zero threshold comparator connected to the second decision and regeneration circuit and determining the sign of the difference Y-Ŷ, i.e. sgn (Y-Ŷ); a first logic EXCLUSIVE-OR gate supplying a signal sgn (X-X̂) sgn (Y); a second EXCLUSIVE-OR gate supplying a signal -sgn (Y-Ŷ) sgn (X); an adder supplying a signal sgn (X-X̂) sgn (Y) -sgn (Y-Ŷ) sgn (X) applied to the voltage controlled oscillator.

3 Claims, 16 Drawing Figures

CARRIER WAVE REGENERATING CIRCUIT

BACKGROUND OF THE INVENTION

The present invention relates to a carrier wave regenerating circuit. It is used in digital transmission and more particularly in the case where, after having been transmitted by the modulation of an electromagnetic wave, information is restored by coherent demodulation. The field of application of the invention is consequently very wide and covers the modems of data transmission, radio links, space communications systems and optics (in the case of heterodyne connections).

The coherent demodulation of a wave presupposes that the receiver knows the frequency and phase of the transmission carrier wave. To this end, a demodulation wave is produced by a voltage-sensitive oscillator or VSO and the control voltage of this oscillator is supplied by a phase comparator, which supplies an error voltage $\epsilon(\phi)$, which is a function of the phase deviation $\phi$ between the modulated wave and that which is produced by the oscillator. Bearing in mind the fact that the transmission carrier wave can be modulated in amplitude and/or phase, the phase comparator structure is dependent on the modulation used.

Figures 1, 2, 3, 4:
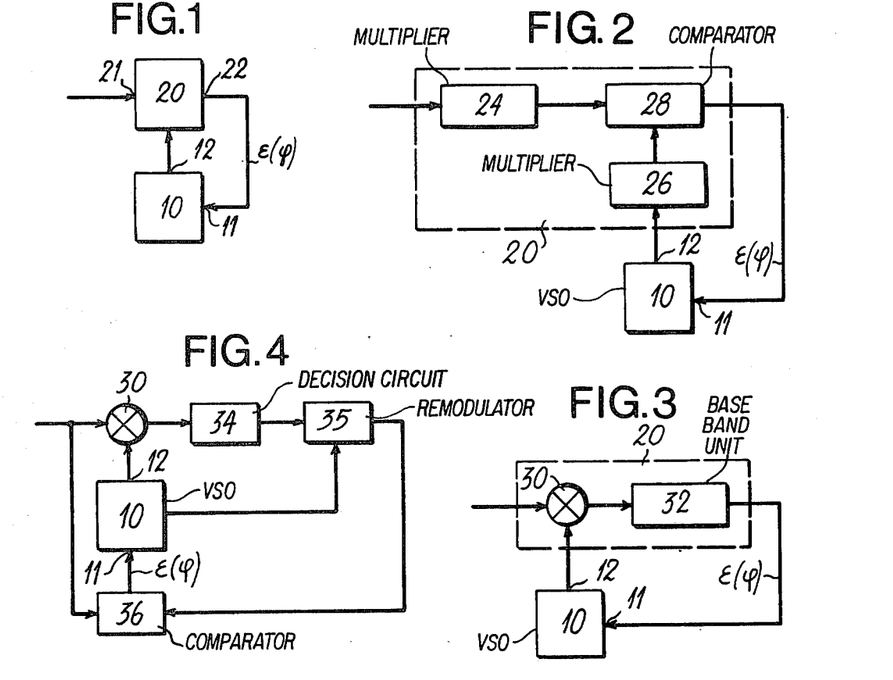
FIG. 1 the structure of a phase locking loop.
FIG. 2 a multiplication loop.
FIG. 3 the COSTAS loop with base band processing.
FIG. 4 a remodulation loop.

FIG. 1 is a general diagram of a carrier wave regenerating circuit. A VSO 10 has a control input 11 and an output 12 and supplies a wave applied to a member 20 having another input 21, which receives the modulated wave and an output 22 supplying an error signal $\epsilon(\phi)$. This signal is applied on the return to the VSO input 11.

The characteristic $\epsilon(\phi)$ of the phase comparator 20 must have the following properties:

(i) it breaks down with the phase deviation $\phi$ and changes sign with $\phi$, (ii) it is cyclic of cyclic $2\pi/M$ in which M is the order of symmetry of the modulation, (iii) it only breaks down once per cycle.

To provide a better understanding of the features of the invention, it is worth referring to the main known types of structures used for regenerating a carrier in this way. The case of phase modulation or PM will firstly be referred to and then that of amplitude modulation in its variant with two waves in quadrature or QAM.

In phase modulation systems, a number of loops are known which will be briefly described in connection with FIGS. 2 to 4. It is assumed that this modulation involves M phase states, M being in general equal to 4, 8 or higher.

In a first type of loop, the frequency, i.e. the phase is multiplied by M, which eliminates the modulation and the VSO is made dependent on the thus produced wave. A loop according to this principle is shown in FIG. 2. It comprises two multipliers by M, respectively 24 and 26, both connected to a phase comparator 28.

In a second type of loop, called the COSTAS loop, an error signal of form sin M$\phi$ is formed by working on the base band, i.e. on the demodulated signal. FIG. 3 shows the corresponding structure. It comprises a demodulator 30 and a base band processing signal 32 able to process the error signal in question.

In a third type of loop, the phase of the signal is compared with that of its remodulated version. Such a loop is shown in FIG. 4. In addition to the VSO 10 and demodulator 30, it comprises a decision circuit 34 for regenerating the information contained in the demodulated signal, said circuit being followed by a remodulator 35. A comparator 36 receives the modulated wave and the remodulated wave.

In another type of loop, which is not illustrated because it is very similar to the previous loop, the remodulation processing takes place in the base band, as for the COSTAS loop.

Finally, in the so-called digital COSTAS loop, the error signal formed is of the type sgn(sin M$\phi$) in which sgn represents the sign of the quantity which follows, this notation also being used throughout the remainder of the description. The latter loop has the advantage of a simple construction (the sign multipliers being formed by EXCLUSIVE-OR logic gates), whilst having good performance levels (the corresponding ideal phase comparator slope d$\epsilon$/d$\phi$ would be infinity in the absence of noise.

Figure 5:
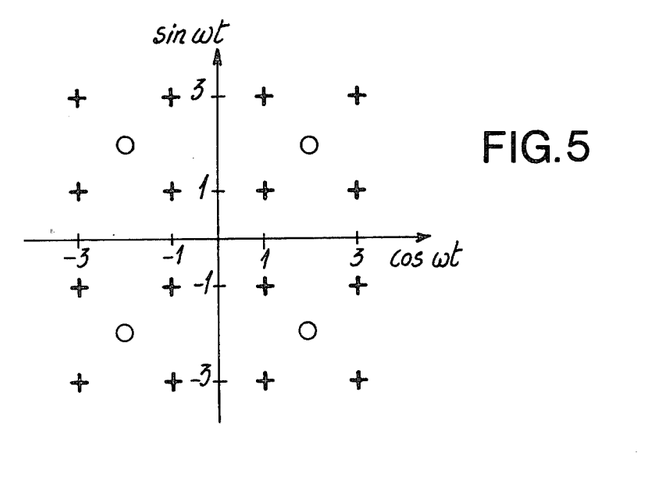
FIG. 5 the 16 possible modulation states of the QM 16.

With regards to the carrier regenerating loops, usable with the second type of modulation, called QAM, they are illustrated in FIGS. 5 to 7. QAM 16 can be considered as the superimposing of two waves in quadrature, each modulated in accordance with four amplitude levels. The 16 possible modulation states can be represented on a vector diagram, which is also called a constellation and which is shown in FIG. 5. In the latter, each axis represents a wave, whose amplitude can assume any one of four amplitude levels 3, $-1$, 1 and $-3$ and each state is represented by a cross.

Several loops functioning in QAM 16 are known. Certain of these are of the remodulation type, cf FIG. 4, but having a more complex structure, because QAM is more complicated than PM.

To simplify the construction of such a loop, instead of comparing the signal with its remodulated version, it is compared with the signal with four phase states corresponding to the mean value of the states of each quadrant. These four mean states are shown in the diagram of FIG. 5 by a circle in each quadrant. Although it is simpler than the previous loop, the present loop introduces a "modulation noise", because the error signal is only cancelled out on average for $\phi=0$.

According to another type of loop, specifically the digital COSTAS loop, the QAM signal 16 is processed as if it was a PM signal 4. Although simpler than the previous loop, this loop unfortunately has the deficiency of modulation noise.

According to another type of loop, called the digital COSTAS loop with selective gate, the error signal is only formed on the basis of the diagonal states of the vector diagram, corresponding to phases of 45°, 135°, 225° and 315°, which are those of a PM 4. Thus, the modulation noise is removed, by eliminating the contribution of the non-diagonal states to the error signal by means of a selective gate. This loop is described in the article by Horikawa et al entitled "Design and performance of a 200 Mbit/16 QAM digital radio system" published in the Journal IEEE Trans COM, Dec. 27th 1979, p. 1953. At present, this is the loop with the best performance features.

With regards to QAM 32 and QAM 64 modulations, no structure has as yet been proposed, apart from the extension to these modulations of the methods used for QAM 16.

All the prior art circuits have a number of disadvantages.

Figure 6:
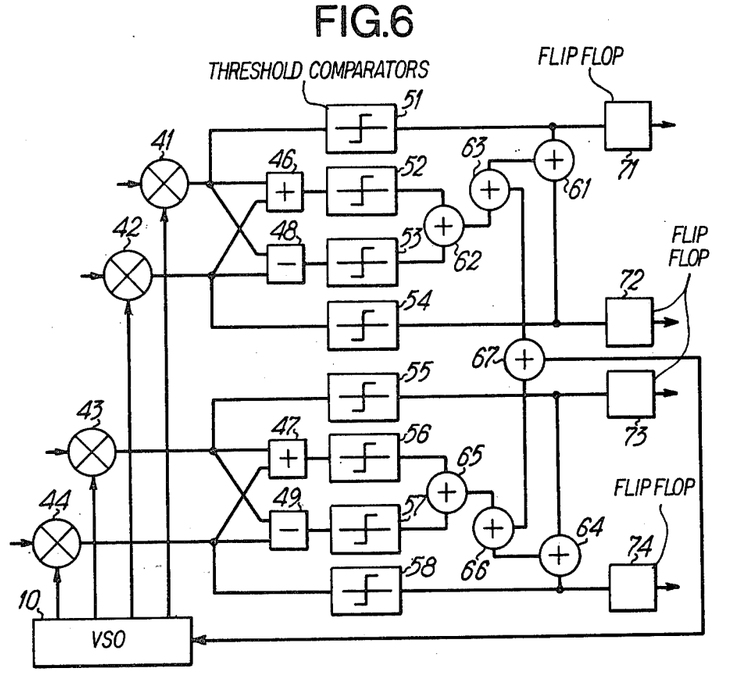
FIG. 6 a digital COSTAS loop in PM 8.

(1) In PM 8, the digital COSTAS loop leads to a very heavy structure, as can be gathered from FIG. 6. The loop comprises four demodulators 41, 42, 43 and 44 working with waves phase-shifted by 45° from one another, two adders 46, 47, two subtracters 48, 49, 8 threshold comparators 51 to 58, 7 logic EXCLUSIVE-OR gates 61 to 67 four flip-flops 71 to 74. In a simpler variant, only two modulators functioning in quadrature are used, with one adder, one subtracter and two supplementary comparators. This type of structure is described in the article by HOGGE published in the Journal IEEE Com 26, No. 5, May 1978, pp. 528–533.

With such a loop, an error signal is formed which, for PM 4, is of form:

$$\epsilon(\phi) = sgn(X)sgn(Y)sgn(X-Y)sgn(X+Y)$$

(2) In QAM 16, the following disadvantages are encountered. In the case of the partial remodulation loop and the conventional digital COSTAS loop, a modulation noise appears and the error signal is not cancelled out with the phase error except on an average basis. In the case of the digital COSTAS loop with the selective gate, the system may not tolerate a situation in which only the non-diagonal signals are transmitted. Even in the case of digital COSTAS loops, it is necessary to carry out subtractions of the analog signals, which causes constructional problems.

BRIEF SUMMARY OF THE INVENTION

The object of the invention is to obviate all these disadvantages and more specifically the aim of the invention is to:

supply a universal structure for a carrier regenerating loop suitable both for PM and QAM (whereas generally the processing operations differ);

propose a simpler PM 8 demodulator structure than that using the COSTAS loop;

obtain good performances in QAM 16 (the slope of the ideal comparator proposed is double that of the COSTAS loop wtih selective gate) and use all the points of the vector diagram, i.e. both diagonal and non-diagonal;

propose a demodulation structure in QAM 32 and QAM 64.

To this end, the invention proposes the use of means able to form an error signal $\epsilon(\phi)$ given by the following expression:

$$\epsilon(\phi) = sgn(X - \hat{X})sgn(Y) - sgn(Y - \hat{Y})sgn(X)$$

in which $\hat{X}$ and $\hat{Y}$ are restored signals corresponding to the demodulated signals X and Y obtained by demodulations in quadrature.

More specifically, the present invention relates to a circuit for regenerating a carrier wave on the basis of a modulated wave, comprising in per se known manner a voltage-sensitive oscillator having a control input and an output supplying the carrier wave, a first demodulator with two inputs, one receiving the modulated wave and the other being connected to the output of the oscillator, a second demodulator with two inputs, one receiving the modulated wave and the other being connected to the oscillator across a 90° phase shifter, each demodulator supplying a demodulated signal, respectively X for the first and Y for the second, and means for processing the signals X and Y for producing an error signal $\epsilon(\phi)$, which is applied to the input of the oscillator and which is able to modify the phase of the latter in order to make it equal to the modulated wave, wherein the processing means making it possible to produce the error signal comprise:

a first decision and restoration circuit with an input connected to the first demodulator and an output supplying a different signal $(X - \hat{X})$, in which $\hat{X}$ is a signal restored from signal X;

a first zero threshold comparator with an input connected to the first modulator and an output supplying a signal determining the sign of X, i.e. sgn X;

a second zero threshold comparator connected to the output of the decision and restoration circuit and determining the sign of the different $X - \hat{X}$, i.e. $sgn(X - \hat{X})$;

a second decision and restoration circuit with an input connected to the second demodulator and an output supplying a difference signal $(Y - \hat{Y})$, in which $\hat{Y}$ is a signal restored from signal Y;

a third zero threshold comparator with an input connected to the second demodulator and an output supplying a signal determining the sign of Y, i.e. sgn Y;

a fourth zero threshold comparator connected to the output of the second decision and restoration circuit and determining the sign of the difference $Y - \hat{Y}$, i.e. $sgn(Y - \hat{Y})$;

a first logic EXCLUSIVE-OR gate with two inputs, one connected to the output of the third comparator and receiving $sgn(X - \hat{X})$ and the other to the output of the second comparator and receiving sgn(Y), said first gate supplying to an output a signal $sgn(X - \hat{X})sgn(Y)$;

a second EXCLUSIVE-NOR gate with two inputs, one connected to the output of the fourth comparator and receiving $sgn(Y - \hat{Y})$ and the other to the output of the second comparator and receiving sgn(X), said second gate supplying at an output a signal $-sgn(Y - \hat{Y})sgn(X)$;

an adder with two inputs, the first connected to the output of the first gate and the second to the output of the second gate, said adder supplying at a gate a signal $sgn(X - \hat{X})sgn(Y) - sgn(Y - \hat{Y})sgn(X)$, which constitutes the error signal $\epsilon(\phi)$, said output being connected to the control input of the voltage-sensitive oscillator.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 7:
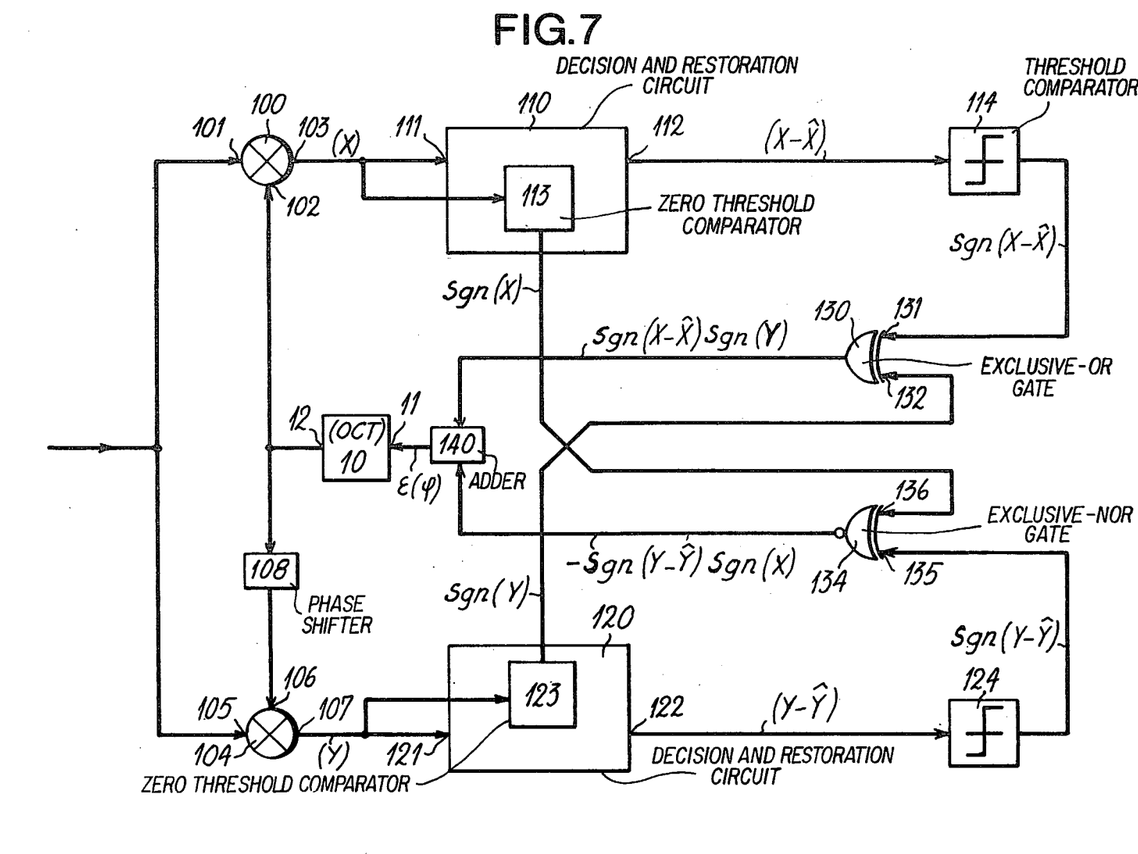
FIG. 7 the general structure of the circuit according to the invention.

The circuit shown in FIG. 7 comprises in per se known manner a VSO 10 with a control input 11 receiving a signal $\epsilon(\phi)$ and an output 12 supplying a wave, whose phase is dependent on the control signs. The circuit then comprises two demodulators 100, 104, the first having two inputs 101 and 102, respectively receiving the modulated wave and the wave supplied by the VSO, and an output 103 supplying a signal X, the second with two inputs 105, 106, respectively receiving the modulated wave and the wave from the VSO, previously phase-shifted by 90° using a phase shifter 108 and with one output 107 supplying a signal Y.

These means are already used in the circuits referred to hereinbefore for which processing is performed in base band, i.e. on the basis of demodulated signals. The invention relates to the means for carrying out this processing, i.e. to the loop making it possible to control the VSO at its input 11 by a circuit able to tune the phase of the VSO to that of the modulated wave.

The circuit according to the invention firstly comprises the processing means for signal X constituted by:

a first decision and restoration circuit 110 with an input 111 connected to a first demodulator 100 and with an output 112 supplying a difference signal $(X - \hat{X})$, in which $\hat{X}$ is a signal restored from the signal X;

a first zero threshold comparator 113 with an input connected to the first modulator 100 and an output supplying a signal determining the sign of X, i.e. sgn(X);

a second zero threshold comparator 114 connected to the output 112 of the decision and restoration circuit 110 and determining the sign of the difference $X - \hat{X}$, i.e. $sgn(x - \hat{X})$.

The circuit according to the invention comprises in the same way the means for processing signal Y constituted by: a second decision and restoration circuit 120 with an input 121 connected to the second demodulator 104 and an output 122 supplying a difference signal $(Y - \hat{Y})$, in which $\hat{Y}$ is a signal restored from signal Y;

a third zero threshold comparator 123 with an input connected to the second demodulator 104 and an output supplying a signal determining the sign of Y, i.e. sgn (Y);

a fourth zero threshold comparator 124 connected to output 122 of the second decision and restoration circuit 120 and determining the sign of the difference $Y - \hat{Y}$, i.e. $sgn(Y - \hat{Y})$.

In practice, it is normal for the decision and restoration circuits 110 and 120 to comprise means for determining the sign of X and Y. It is for this reason that the means 113 and 123 are shown within the circuits 110 and 120.

The circuit according to the invention also comprises:

a first logic EXCLUSIVE-OR gate 130 with two inputs 131, 132, the first connected to the output of the third comparator 114 and receiving $sgn(X - \hat{X})$ and the second to the output of the second comparator 123 and receiving sgn(Y), said first gate 130 supplying at an output a signal $sgn(X - \hat{X})sgn(Y)$;

a second EXCLUSIVE-NOR gate 134 with two inputs 135, 136, the first connected to the output of the fourth comparator 124 and receiving $sgn(Y - \hat{Y})$ and the second to the output of the first comparator 113 and receiving sgn(X), said second gate supplying at an output a signal $sgn(Y - \hat{Y})sgn(X)$.

Finally, the circuit comprises an adder 140 with two inputs, the first connected to the output of the first gate 130 and the second to the output of the second gate 134, said adder supplying at an input a signal $sgn(X - \hat{X})sgn(Y) - sgn(Y - \hat{Y})sgn(X)$, which constitutes the error signal $\epsilon(\phi)$, said output being connected to the control input of the voltage-sensitive oscillator 10.

It would obviously not pass beyond the scope of the invention to use as the logic gate 134, an EXCLUSIVE-OR gate identical to gate 130. In this case, the output of the gate in question would not be reversed and it would merely be necessary to use a subtracter in place of adder 140. However, the described variant is simpler because it requires an adder.

For explanation purposes, two examples of the decision and restoration circuit such as 110 and 120 will now be described, respectively in the case of QAM 16 and MP 8 modulations.

Figure 8:
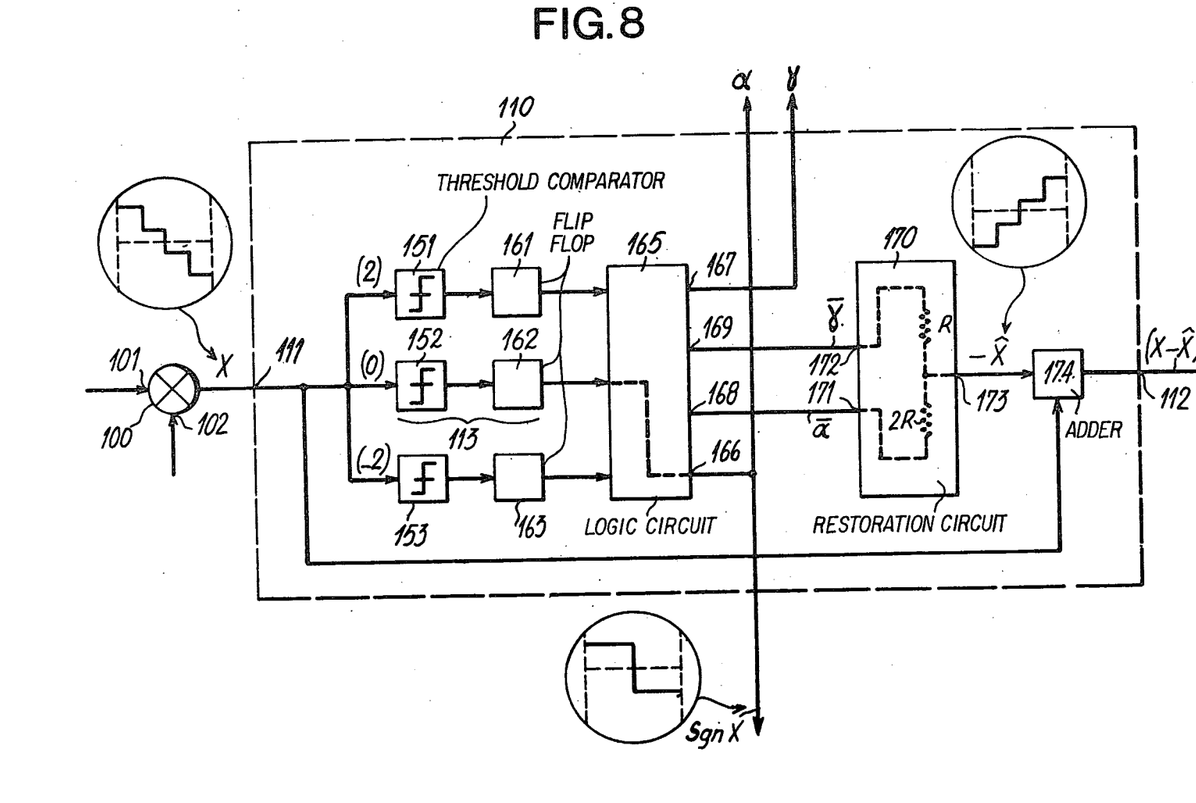
FIG. 8 an embodiment of a decision and restoration circuit in QAM 16 modulation.

In the case of QAM 16, a possible circuit is illustrated in FIG. 8. It corresponds to circuit 110 of FIG. 7 processing signal X. Circuit 120 is identical, but processes signal Y.

The circuit comprises three threshold comparators 151, 152, 153, being respectively 2, 0 and −2. Each comparator is followed by a flip-flop 161, 162, 163 respectively. The outputs of these flip-flops are connected to a logic circuit 165 able to translate the state of these three flip-flops into a number having two bits $\alpha$ and $\gamma$. These two bits appear at outputs 166, 167 and the complementary bits $\bar{\alpha}$ and $\bar{\gamma}$ at the outputs 168, 169.

The circuit also comprises a restoration circuit 170 with two inputs 171, 172, each receiving respectively the complementary bits $\bar{\alpha}$ and $\bar{\gamma}$ and with one output 173 supplying a signal $-\hat{X}$. Finally, an adder 174 with two inputs connected to the output 173 of the converter and to input 111 completes the circuit.

The circuit operates in the following way. In the case of QAM 16, the modulator, for each of the two carriers in quadrature, brings about correspondence with a number having two bits, one amplitude state taken from among four (in the considered example +3, +1, −1, −3). The receiver must regenerate this digital information on the basis of the demodulated wave. To this end, circuit 110 must firstly fulfil a decision function in order to restore the digital information in question, i.e. the two original bits using the demodulated signal X. The circuit must then perform a restoration able to form an analog signal $\hat{X}$ on the basis of the two bits in question. In the circuit of FIG. 8, the decision is taken by three threshold comparators 151 to 153, which compare the demodulated signal X with the respective thresholds +2, 0, −2. As a result of these means, it is possible to find which of the four levels +3, +1, −3, −1 is present on the modulated signals. The function of flip-flops 161 to 163 is to store the state of the comparators. Circuit 165 translates these states into a number with two bits $\alpha$ and $\gamma$.

It is pointed out that the zero comparator 152 and its associated flip-flop 162 in themselves permit the detection of the sign of X. This comparator and this flip-flop must form the means 113 supplying the signal sgn X. In practice, it is bit $\alpha$ which reflects this sign in such a way that sgnX can be samples at output 166 of logic circuit 165.

On the basis of bits α and γ, the four-level signal can easily be restored. This is the function of circuit 170. The latter can be an adder with two resistors, whereon one has a value double that of the other, the voltages corresponding to the bits being applied to the ends of the resistors. The analog signal X is then sampled between the resistors (this means being represented in dotted line form in FIG. 8).

To the extent that it is necessary for forming the difference X−X̂, it is easier to directly form −X̂ in place of X̂, because it is then sufficient to add X to (−X̂) to obtain the sought difference, which makes it possible to use an adder 174 in place of a more complex subtracter. Under these conditions, to obtain −X̂, the restoration circuit 170 is connected to the complementary outputs 168, 169, instead of to the outputs 166, 167 of circuit 165.

Figure 9:
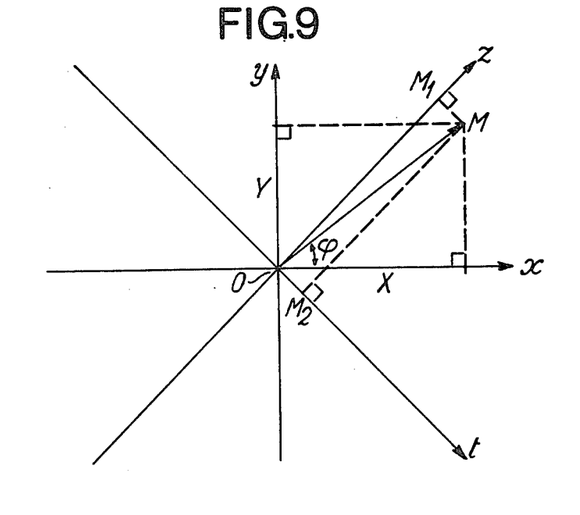
FIG. 9 a diagram illustrating the modulation principle of PM 8.

In PM 8 modulation, the modulator associates a triplet of bits with each phase state. On reception, the demodulator consists of using four demodulators on which act waves, whose respective phases are 0°, 45°, 90° and 135°. In a Fresnel plane, such as that of FIG. 9, these waves correspond to axes Ox, Oy, Oz and Ot. The vector $\overrightarrow{OM}$ of polar angle $\phi$ represents the wave to be demodulated. In this Fresnel plane, the demodulation is translated by the projection of point M on the four axes. The two projections on Ox and Oy are nothing more than the demodulated outputs X and Y. On calculating $OM_1$ from the demodulator at 45°, and $OM_2$ from the demodulator at 135°, we find without difficulty:

$$OM_1 = (X+Y)/\sqrt{2}$$

$$OM_2 = (X-Y)/\sqrt{2}$$

This means that in place of using the two demodulators at 45° and 135°, it is possible on the basis of outputs X and Y of demodulators at 0° and 90°, to construct the quantities $(X+Y)/\sqrt{2}$ and $(X-Y)/\sqrt{2}$ and obtain the same information.

Moreover, the information sgnX and sgnY make it possible to determine one from among the four quadrants (0°–90°) (90° to 180°) (180° to 270°) (270° to 360°), whilst the informatio sgn(X−1 Y) and sgn(X+Y) make it possible to determine another of the four quadrants (315°–415°) (45°–135°) (135°–225°) (225°–315°). These two determinations define a circular sector of apex angle 45° and indicate which of the 8 possible phases has been transmitted.

To restore the signals X̂ and Ŷ on the basis of the demodulated signals X and Y, it is then merely necessary to form the quantities:

$$\hat{X} = [sgn(X+Y) + sgn(X-Y)/\sqrt{2}] + sgnX$$

$$\hat{Y} = [sgn(X+Y) - sgn(X-Y)/\sqrt{2}] + sgnY$$

As in practice it is the quantities (X−X̂) and (Y−Ŷ) which are sought, instead of restoring X̂ and Ŷ it is of greater interest to restore −X̂ and −Ŷ as in the previous case which, by simple addition with X and Y makes it possible to obtain the sought differences.

It is pointed out that the restoration of X̂ and Ŷ only requires the knowledge of the signs of certain quantities and not, as in QAM 16, the knowledge of the bits corresponding to the processed phase state. Therefore, a restoration circuit in PM 8 modulation does not necessarily comprise logic circuits permitting the extraction of the bits. Under these conditions, the decision and restoration circuits 110, 120 can be in the form illustrated in FIG. 10.

Figure 10:
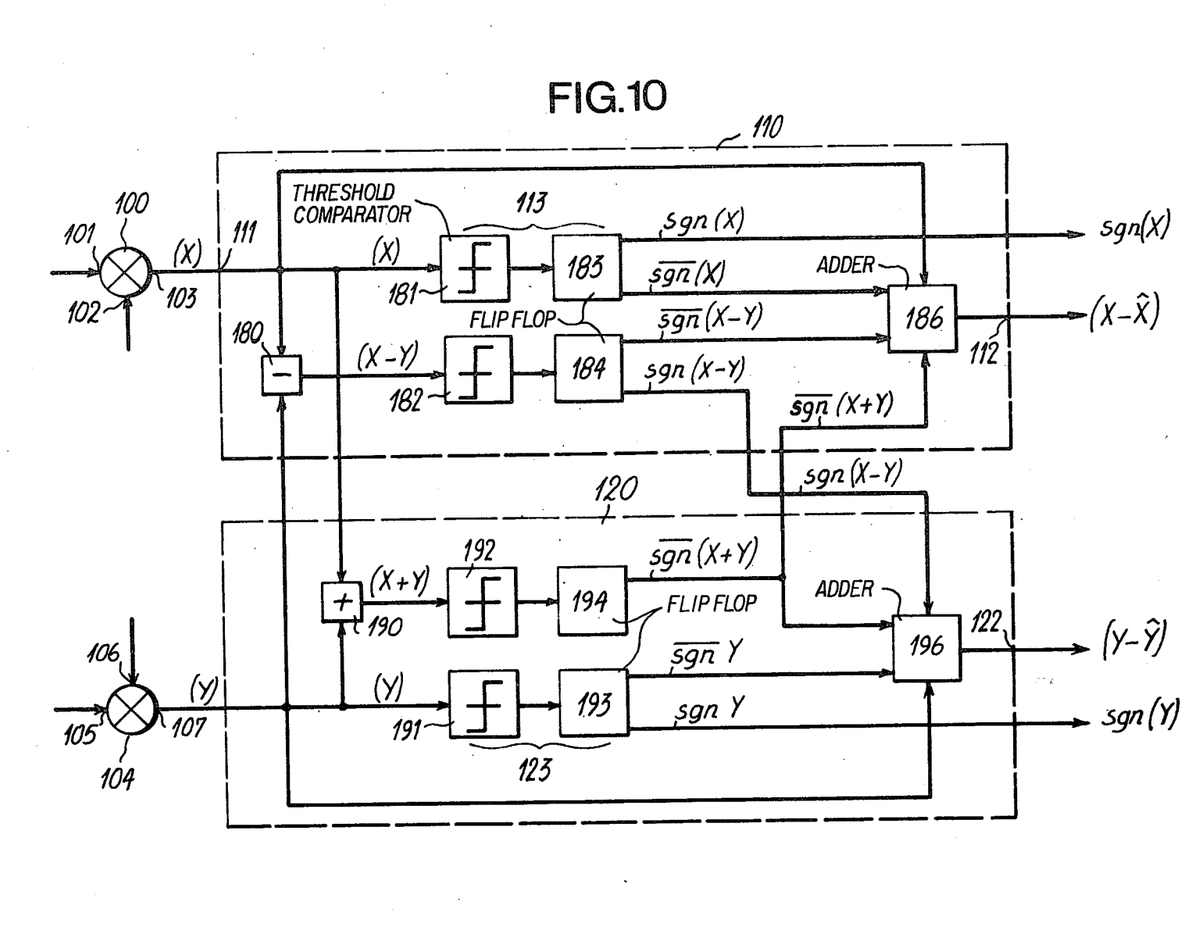
FIG. 10 an embodiment of a decision and restoration circuit in PM 8 modulation.
Figures 11, 12:
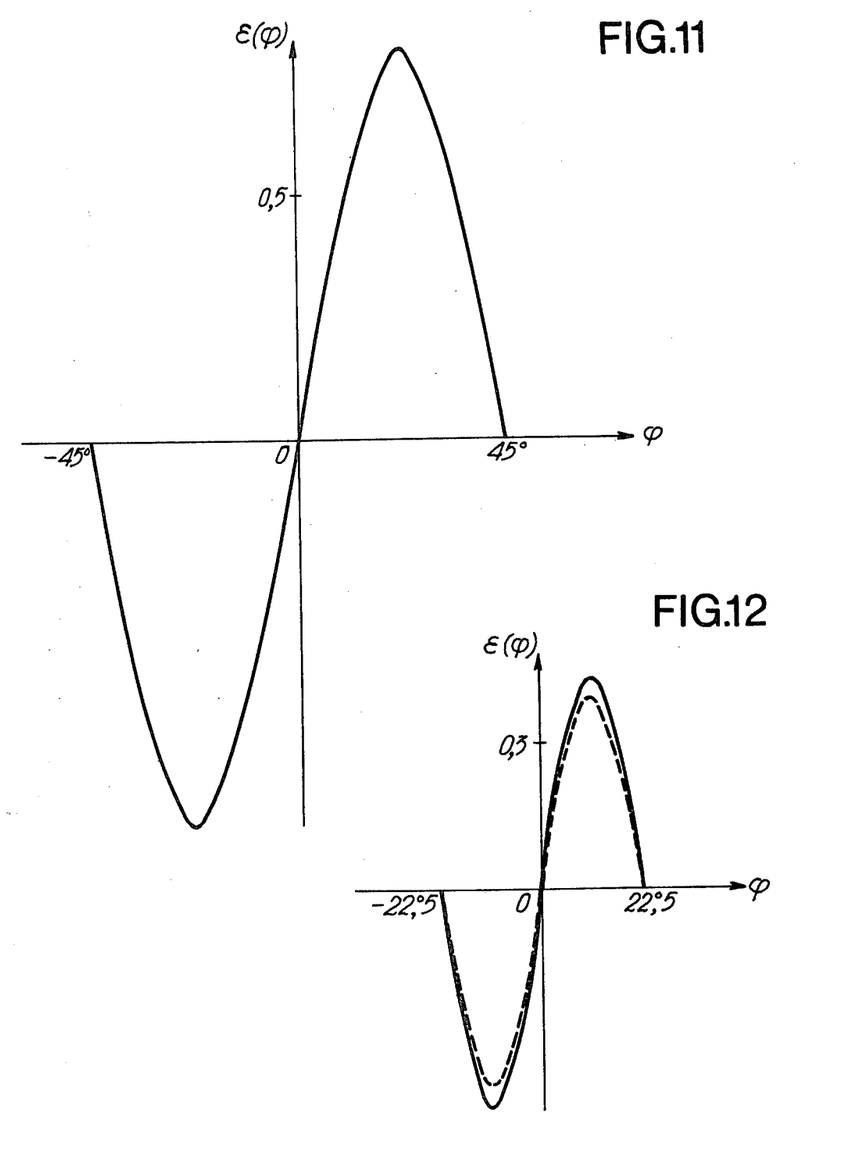
FIG. 11 the features of a circuit according to the invention functioning in PM 4 modulation.
FIG. 12 the same characteristic for PM 8 modulations.

Circuit 110 firstly comprises a subtracter 180, which receives the demodulated signals X and Y and supplies a signal X−Y, two zero threshold comparators 181, 182 respectively receiving the signals X and X−Y and supplying, via the associated flip-flops 183, 184, respectively the signs of X and (X−Y). Thus, for the reasons indicated hereinbefore, the complementary outputs for supplying $\overline{sgn}(X)$ and $\overline{sgn}(X-Y)$ are used. Circuit 110 is terminated by an adder 186 having four inputs receiving respectively X, $\overline{sgn}(X)$, $\overline{sgn}(X-Y)$, as well as sgn(X+Y) coming from the second decision and restoration circuit 120. Adder 186 directly forms the difference X−X̂.

It is pointed out that comparator 181 and the associated flip-flop form the means 113 for determining the sign of X of which it is a question in the generic definition of the invention.

Circuit 120 comprises an adder 190 with two inputs receiving the demodulated signals X and Y, two comparators 191, 192 respectively connected to demodulator 104 and adder 190, said comparators being associated with two flip-flops 193, 194. Flip-flop 193 supplies sgnY and its complement $\overline{sgn}Y$. Flip-flop 194 supplies sgn(X+Y), which is used in the adder 186 of circuit 110. Circuit 120 also comprises an adder 196, respectively receiving Y, $\overline{sgn}Y$ and $\overline{sgn}(X+Y)$ as well as sgn(X−Ŷ) comimg from flip-flop 184 of circuit 110. This adder directly forms the difference (Y−Ŷ).

FIGS. 11 to 15 illustrate the results obtained with the circuit according to the invention. They represent the characteristic of the circuit, i.e. the variation of the error signal $\epsilon(\phi)$ as a function of the phase deviation $\phi$. They respectively relate to the cases of modulations:

PM 4 (FIG. 11) (carrier wave to noise ratio: 10 dB)
PM 8 (FIG. 12) (carrier wave to noise ratio: 15 dB)
QAM 16 (FIG. 13) (carrier wave to noise ratio: 19 dB)
QAM 32 (FIG. 14) (carrier wave to noise ratio: 20 dB)
QAM 64 (FIG. 15) (carrier wave to noise ratio: 30 dB).

In all these Figs, the continuous line curves are theoretical curves and the broken line curves experimental curves.

Figures 13, 14:
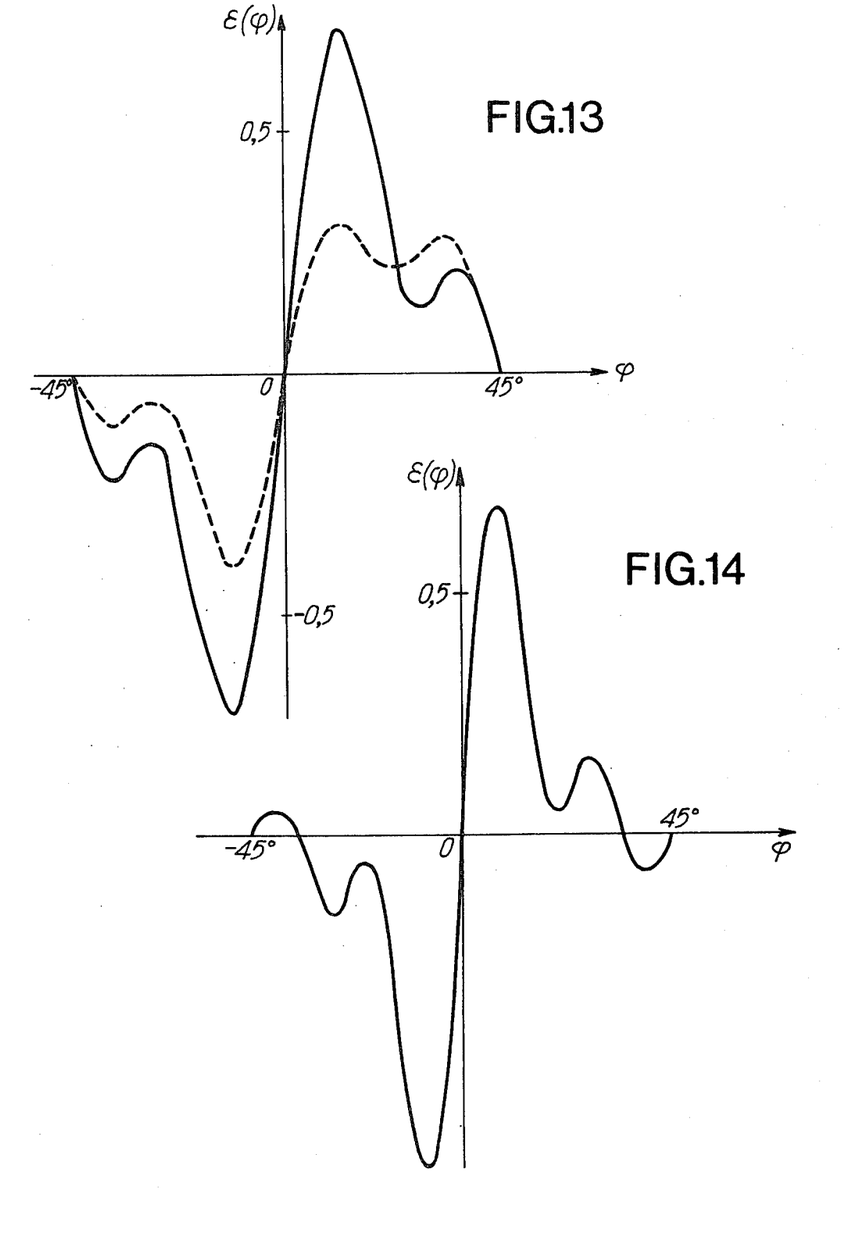
FIG. 13 the same characteristic for QAM 16 modulations.
FIG. 14 the same characteristic for QAM 32 modulations.
Figure 15:
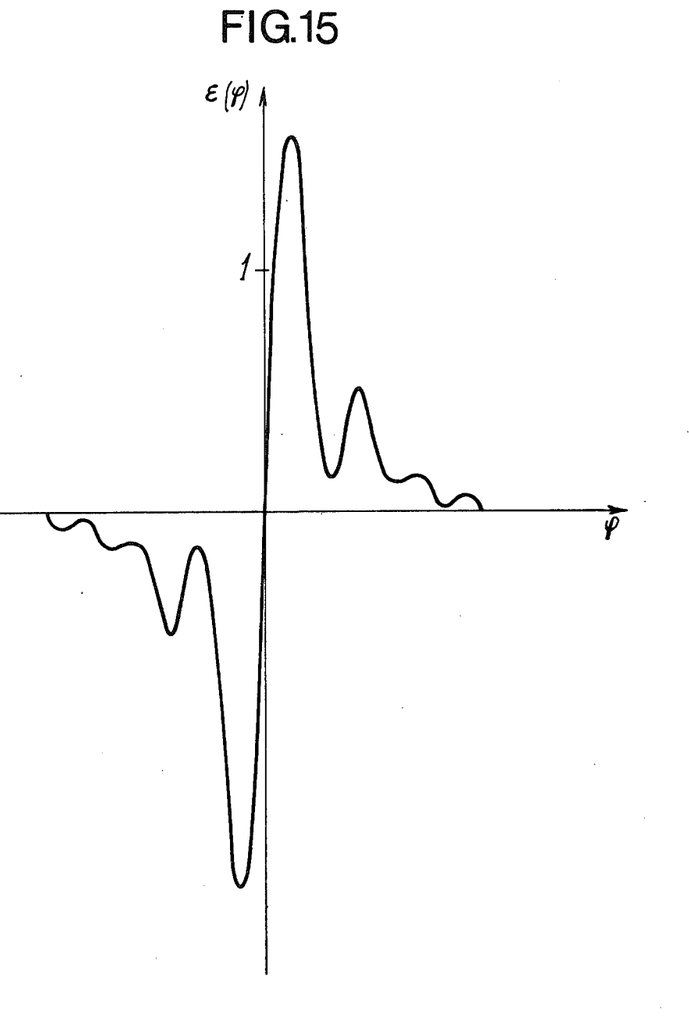
FIG. 15 the same characteristic for QAM 64 modulations.

It is pointed out that property (iii) referred to hereinbefore for the error signal is not satisfied for QAM 32, because the signal has a zero for 100 =45°. However, as the local minimum of the curve is of low amplitude, a slight voltage displacement on the oscillator permits the easy elimination of this parasitic zero.

Figure 16:
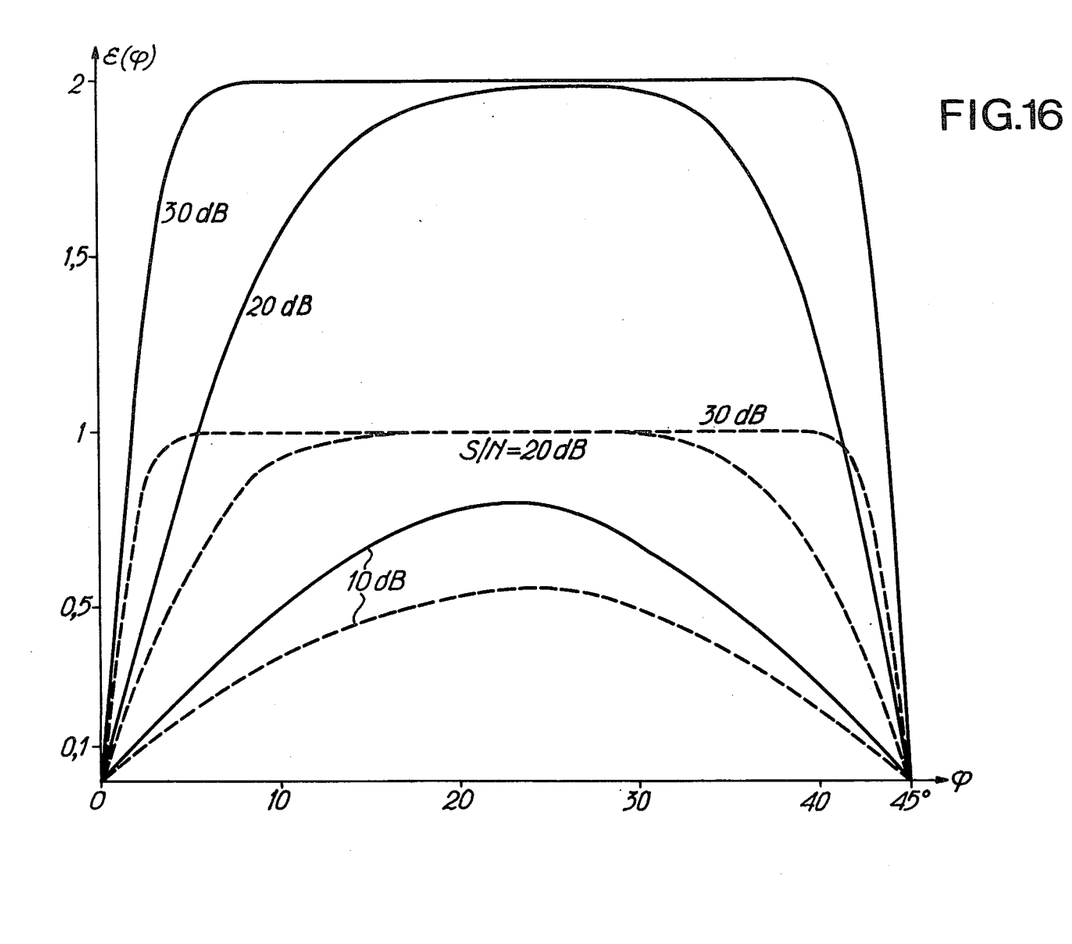
FIG. 16 the characteristics in PM 4 modulation of a digital COSTAS loop and a circuit according to the invention.

Finally, FIG. 16 makes it possible to make a comparison between the results obtained with the circuit according to the invention in PM 4 modulation and thoseobtained with a digital COSTAS loop. The curves correspond to several carrier to noise ratios. Those plotted in continuous line form correspond to the circuit according to the invention and those in broken line form to the prior art loop.

It is apparent from the description, that the invention leads to numerous advantages:

a better slope dε (φ)dφ than with other circuits;
a use of all the points of the vector diagram (in PM and QAM);
a simpler technological realisation (use of adders and EXCLUSIVE-OR gates);

performances in PM 4 and PM 8 identical to those of the conventional digital COSTAS loop, but with a better slope $d\epsilon/d\phi$.

What is claimed is:

1. A circuit for regenerating a carrier wave on the basis of a modulated wave, comprising
    a voltage-controlled oscillator having a control input and an output supplying the carrier wave,
    a first demodulator with two inputs, one receiving the modulated wave and the other being connected to the output of the oscillator,
    a second demodulator with two inputs, one receiving the modulated wave and the other being connected to the oscillator through a 90° phase shifter, each demodulator supplying a demodulated signal, respectively X for the first and Y for the second, and means for processing the signals X and Y for producing an error signal $\epsilon(\phi)$, which is applied to the input of the oscillator and which is able to modify the phase of the latter in order to make it equal to the modulated wave, wherein the processing means makes it possible to produce an error signal comprising:
    a first decision and regeneration circuit with an input connected to the first demodulator and an output supplying a difference signal $(X-\hat{X})$, in which $\hat{X}$ is a signal regenerated from signal X;
    a first zero threshold comparator with an input connected to the first modulator and an output supplying a signal determining the sign of X, i.e. sgn X;
    a second zero threshold comparator connected to the output of the decision and regeneration circuit and determining the sign of the difference $X-\hat{X}$, i.e. sgn $(X-\hat{X})$;
    a second decision and regeneration circuit with an input connected to the second democulator and an output supplying a difference signal $(Y-\hat{Y})$, in which $\hat{Y}$ is a signal regenerated from signal Y;
    a third zero threshold comparator with an input connected to the second demodulator and an output supplying a signal determining the sign of Y, i.e. sgn Y;
    a fourth zero threshold comparator connected to the output of the second decision and regeneration circuit and determining the sign of the difference $Y-\hat{Y}$, i.e. sgn $(Y-\hat{Y})$;
    a first logic EXCLUSIVE-OR gate with two inputs, one connected to the output of the third comparator and receiving sgn $(X-\hat{X})$ and the other to the output of the second comparator and receiving sgn $(Y)$, said first gate supplying to an output a signal sgn $(X-\hat{X})$ sgn $(Y)$;
    a second EXCLUSIVE-OR gate with two inputs, one connected to the output of the fourth comparator and receiving sgn $(Y-\hat{Y})$ and the other to the output of the second comparator and receiving sgn $(X)$, said second gate supplying at an output a signal $-$sgn $(Y-\hat{Y})$ sgn $(X)$;
    an adder with two inputs, the first connected to the output of the first gate and the second to the output of the second gate, said adder supplying at a gate a signal sgn $(X-\hat{X})$ sgn $(Y)-$sgn $(Y-\hat{Y})$ sgn $(X)$, which constitutes the error signal $\epsilon(\phi)$, said output being connected to the control input of the voltage-sensitive oscillator.

2. A circuit according to claim 1, wherein the first and second decision and restoration circuits comprise in the case of QAM 16 modulation three different threshold comparators, each followed by a flip-flop; a logic circuit connected to the flip-flops and translating the states thereof into a number with two bits; a regeneration circuit converting the said two bits into a regeneration signal.

3. A circuit according to claim 1, wherein each first and second decision and regeneration circuit comprises, for PM 8 modulation, an adder-subtractor having a first input connected to the input of said first circuit, a second input connected to the input of second circuit and an output, a first threshold comparator having an input and an output, a first flip-flop connected to said output of said first threshold comparator, a second threshold comparator having an input and an output, said input being connected to said output of said adder-subtractor, a second flip-flop connected to said output of said second threshold comparator, an adder with first, second, third, fourth inputs, said first and second inputs being respectively connected to said first and second flip-flops, said third input being connected to the input of decision and regeneration circuit to which said adder belongs, said fourth input of said adder belonging to said first circuit being connected to second flip-flop of second circuit, said fourth input of said adder belonging to said second circuit being connected to second flip-flop of first circuit.

* * * * *